US012794849B2

(12) United States Patent
Liu et al.

(10) Patent No.: US 12,794,849 B2
(45) Date of Patent: Nov. 10, 2026

(54) TRAFFIC SCHEDULING METHOD OF APPLICATION AND APPARATUS, DEVICE AND STORAGE MEDIUM

(71) Applicant: Beijing Youzhuju Network Technology Co., Ltd., Beijing (CN)

(72) Inventors: Guanghang Liu, Beijing (CN); Jinbian Wang, Beijing (CN); Yihui Wang, Los Angeles, CA (US)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 130 days.

(21) Appl. No.: 18/759,597

(22) Filed: Jun. 28, 2024

(65) Prior Publication Data

US 2025/0007876 A1 Jan. 2, 2025

(30) Foreign Application Priority Data

Jun. 30, 2023 (CN) ......................... 202310798556.9

(51) Int. Cl.
*H04L 47/62* (2022.01)
*H04L 61/3015* (2022.01)
*H04L 61/4511* (2022.01)

(52) U.S. Cl.
CPC ............ *H04L 61/302* (2013.01); *H04L 47/62* (2013.01); *H04L 61/4511* (2022.05)

(58) Field of Classification Search
CPC ... H04L 61/302; H04L 47/62; H04L 61/4511; H04L 61/3025; H04L 47/10
See application file for complete search history.

(56) References Cited

U.S. PATENT DOCUMENTS 6,484,143 B1 * 11/2002 Swildens .............. H04L 41/509 709/224
9,282,439 B1 * 3/2016 Qu .......................... H04W 4/10
(Continued)

FOREIGN PATENT DOCUMENTS

CN 107635010 A 1/2018
CN 110570282 A * 12/2019 ......... G06Q 20/3829
(Continued)

OTHER PUBLICATIONS

International Search Report and Written Opinion for International Application No. PCT/CN2024/102313, mailed Oct. 16, 2024, 9 pages.

*Primary Examiner* — Nicholas P Celani
*Assistant Examiner* — Wuji Chen
(74) *Attorney, Agent, or Firm* — BakerHostetler

(57) ABSTRACT

The present disclosure relates to the field of computer technology, and discloses a traffic scheduling method and apparatus of an application, a device and a storage medium. The method comprises: obtaining a first registration area of a target service of the application and a second registration area where an account of a target object is located; detecting whether the first registration area is the same as the second registration area; when the first registration area is not the same as the second registration area, determining a target domain name corresponding to the first registration area based on a mapping relationship between the first registration area and a domain name, the mapping relationship being deployed in the application; and scheduling service traffic generated by the target service to a target server corresponding to the target domain name information.

20 Claims, 4 Drawing Sheets

(56) References Cited

U.S. PATENT DOCUMENTS

| | | | | |
|---|---|---|---|---|
| 9,979,674 | B1 * | 5/2018 | Kumar | H04L 43/0817 |
| 10,728,317 | B1 * | 7/2020 | James | H04L 67/1008 |
| 10,938,919 | B1 * | 3/2021 | Panchanathan | H04L 61/4511 |
| 11,443,307 | B2 * | 9/2022 | Sun | G06Q 20/10 |
| 2006/0116817 | A1 * | 6/2006 | Salmre | G06F 8/35 340/995.14 |
| 2008/0138045 | A1 * | 6/2008 | Nonaka | G11B 20/00739 348/E7.071 |
| 2009/0240709 | A1 * | 9/2009 | Adelman | H04L 61/4511 |
| 2011/0179359 | A1 * | 7/2011 | Nussel | G06F 3/0484 715/738 |
| 2012/0093145 | A1 * | 4/2012 | Anchan | H04W 48/08 370/352 |
| 2013/0159191 | A1 * | 6/2013 | Maiya | G06Q 40/02 705/44 |
| 2013/0263042 | A1 * | 10/2013 | Buening | G06F 3/04883 715/783 |
| 2014/0223283 | A1 * | 8/2014 | Hancock | G06F 40/14 726/4 |
| 2017/0304727 | A1 * | 10/2017 | Gallizzi | A63F 13/493 |
| 2019/0394284 | A1 * | 12/2019 | Baghel | G06F 16/951 |
| 2020/0259893 | A1 * | 8/2020 | James | H04L 67/1044 |
| 2020/0311232 | A1 * | 10/2020 | Chabanne | G06F 21/316 |
| 2021/0027261 | A1 | 1/2021 | An et al. | |
| 2021/0243585 | A1 * | 8/2021 | Kothari | H04W 4/16 |
| 2022/0076251 | A1 * | 3/2022 | Hughes | G06Q 20/3674 |
| 2023/0025658 | A1 * | 1/2023 | Huang | G06F 21/41 |
| 2023/0319528 | A1 * | 10/2023 | Pateromichelakis | H04W 4/44 455/420 |
| 2024/0283871 | A1 * | 8/2024 | Gary | H04L 12/1407 |
| 2025/0048213 | A1 * | 2/2025 | Pateromichelakis | H04L 41/0806 |
| 2025/0078073 | A1 * | 3/2025 | Groarke | G06Q 30/0234 |

FOREIGN PATENT DOCUMENTS

| | | | |
|---|---|---|---|
| CN | 114118838 | A | 3/2022 |
| CN | 115134412 | A | 9/2022 |
| CN | 116132377 | A | 5/2023 |
| CN | 117950828 | A | 4/2024 |

* cited by examiner

TRAFFIC SCHEDULING METHOD OF APPLICATION AND APPARATUS, DEVICE AND STORAGE MEDIUM

CROSS REFERENCE TO RELATED APPLICATION

This application claims priority from Chinese Patent Application No. 202310798556.9, filed on Jun. 30, 2023, which is incorporated herein by reference in its entirety for all purposes.

TECHNICAL FIELD

The present disclosure relates to the field of computer technology, and specifically, to a traffic scheduling method of an application and apparatus, a device and a storage medium.

BACKGROUND ART

With the launch of various applications (APPs), some applications will be available in multiple areas, which needs to support users in different areas in use of the same APP. However, if one APP is to support the usages of the users in different areas, it necessarily needs to support scheduling user traffic to servers in different areas for service processing, or processing user service of all the areas on servers in a fixed area range.

Currently, in the related art, when an APP is registered, a registration area tag is tagged to a registration device or registration user, to schedule user traffic to a corresponding server according to the registration area tag.

SUMMARY OF THE INVENTION

In view of this, embodiments of the present disclosure provide a traffic scheduling method and apparatus of an application, a device and a storage medium.

In one aspect of the present disclosure, an embodiment of the present disclosure provides a traffic scheduling method of an application APP, comprising: obtaining a first registration area of a target service of the APP and a second registration area where an account of a target object is located, wherein, the first registration area is determined by the APP in response to a registration operation of the target object for the target service, and the second registration area is determined by the APP in response to an account registration operation of the target object; detecting whether the first registration area is the same as the second registration area; determining a target domain name corresponding to the first registration area based on a mapping relationship between the first registration area and a domain name, the mapping relationship being deployed in the APP when the first registration area is not the same as the second registration area; and scheduling service traffic generated by the target service to a target server corresponding to the target domain name information.

In one aspect of the present disclosure, an embodiment of the present disclosure provides an traffic scheduling apparatus of an application APP, comprising: an area obtaining module configured to obtain a first registration area of a target service of the APP and a second registration area where an account of a target object is located, the first registration area being determined by the APP in response to a registration operation of the target object for the target service, and the second registration area being determined by the APP in response to an account registration operation of the target object; a detection module configured to detect whether the first registration area is the same as the second registration area; a domain name determination module configured to, when the first registration area is not the same as the second registration area, determine a target domain name corresponding to the first registration area based on a mapping relationship between the first registration area and a domain name, the mapping relationship being deployed in the application; and a traffic scheduling module configured to schedule service traffic generated by the target service to a target server corresponding to the target domain name information.

In one aspect of the present disclosure, an embodiment of the present disclosure provides a computer device, comprising: a memory and a processor, the memory and the processor being communicatively connected to each other, the memory having computer instructions stored therein, and the processor, by executing the computer instructions, performing the traffic scheduling method of an application according to the first aspect or any implementation corresponding to the first aspect.

In one aspect of the present disclosure, an embodiment of the present disclosure provides a computer-readable storage medium having thereon stored computer instructions, for causing a computer to execute the traffic scheduling method of an application according to the first aspect or any implementation corresponding to the first aspect.

BRIEF DESCRIPTION OF THE DRAWINGS

In order to more clearly illustrate the embodiments of the present disclosure or the technical solutions in the prior art, the drawings that need to be used in the description of the embodiments or the prior art will be briefly described below, and it is obvious that the drawings in the following description are some embodiments of the present disclosure, and for one of ordinary skill in the art, other drawings can be obtained according to these drawings without paying creative labor.

DETAILED DESCRIPTION

Figure 1:
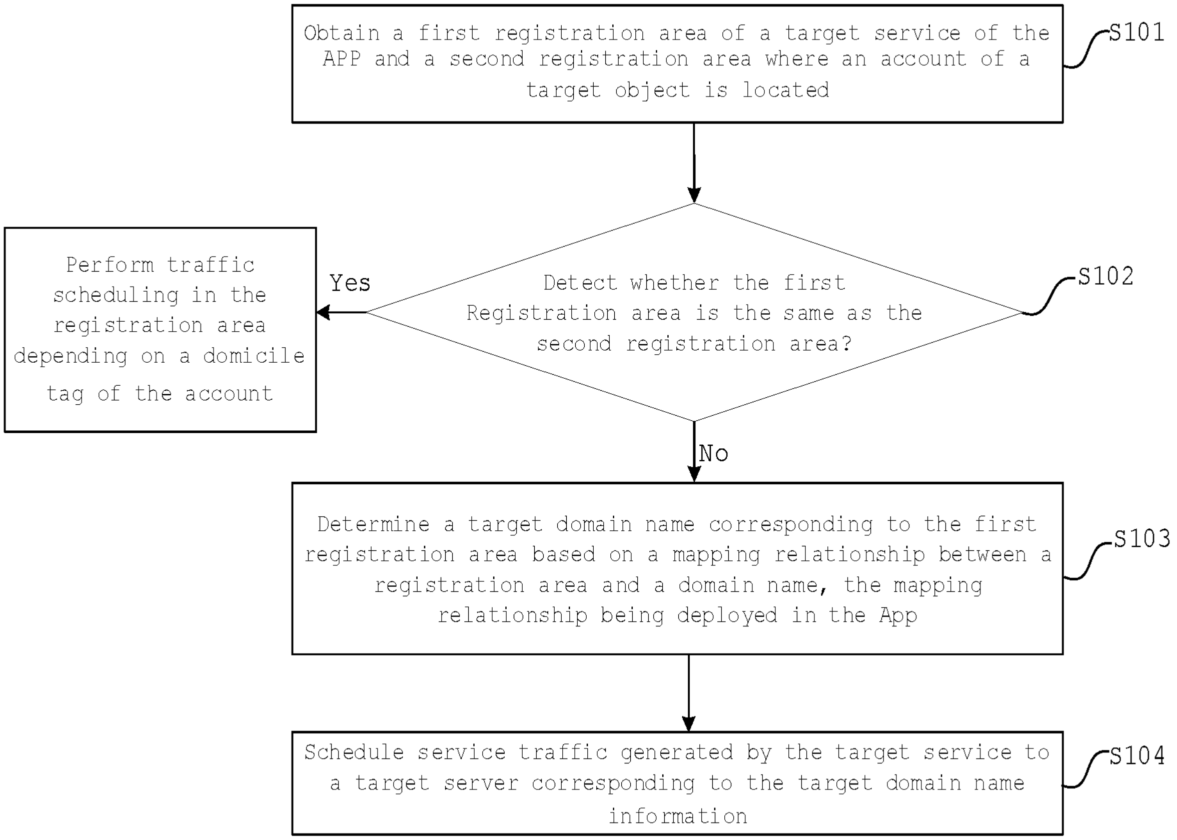
FIG. 1 is a schematic flow diagram of a traffic scheduling method of an application according to an embodiment of the present disclosure.

To make the objectives, technical solutions and advantages of the embodiments of the present disclosure more apparent, the technical solutions in the embodiments of the present disclosure will be described clearly and completely below in conjunction with the drawings in the embodiments of the present disclosure, and it is obvious that the described embodiments are a part of the embodiments of the present disclosure, but not all of them. Based on the embodiments of the present disclosure, all other embodiments, which can be obtained by those skilled in the art without making creative labor, shall fall within the scope of protection of the present disclosure.

In the related art, when an APP is registered, a registration area tag is tagged to a registration device or registration user, and user traffic is scheduled to a corresponding server according to the registration area tag. Taking a certain APP as an example, when starting this APP for the first time, a user device will perform a device registration operation to tag a data registration area tag according to a user area. Thereafter, when starting this APP, a server is requested to configure and issue a traffic scheduling rule (network control, NC) according to a registration area, and a subsequent service requests to schedule traffic generated by this APP to a desired server according to the NC traffic scheduling rule.

The NC is the mapping from one host request to a server real request URL (Uniform Resource Locator), so that in the case of a network request, the APP will issue one host request to the real request URL of the NC according to a mapping relationship of the NC. For example, the NC is therein configured with [www.test.com->www.test-us.com], then when www.test.com is requested, www.test-us.com is actually requested instead, thereby realizing traffic scheduling.

However, if user account data and user service data are attributed to different areas, it is not feasible to schedule traffic depending on registration area only. Taking an APP with a merchant function, i.e., an APP used by a seller, as an example, a merchant located in an area D (for example, country D) may register a store service in an area U (for example, country U), while a registration area registered by the merchant may be in an area Y (for example, country Y). At this time, since store service data is registered in the area U, the store service data of the merchant needs to be scheduled to the area U, and after the area U is selected as the store service, a data request interface for the store service must be able to immediately schedule to a server within the area U.

Moreover, for NC the traffic scheduling rule, there can be a long tail traffic problem in remote scheduling, that is, if traffic is scheduled to a corresponding server depending on the NC traffic scheduling rule only, long tail traffic will be scheduled to an undesired server during a gap between a NC request and a successful packet return. For example, traffic generated by the APP is by default scheduled to a server of a first area, and it is scheduled to a server of a second area through the NC traffic scheduling rule, so that before the traffic scheduling is completed according to the NC traffic scheduling rule, part of the traffic may still be scheduled to the server of the first area. If there are some critical service requests for which a correct server has not been requested in this gap, the case where the service execution result is not matched with the expectation will occur. Moreover, if the pull fails according to the NC traffic scheduling rule, the traffic on the APP can only be scheduled to a server corresponding to the default domain name, and if the default domain name and the service area are not the same area, there is still the problem that the traffic is not scheduled to a correct server.

Based on this, according to this technical solution, a traffic scheduling policy of server domain names corresponding to different areas is built into an APP, to perform traffic scheduling in the APP according to the traffic scheduling policy, so that a correct server corresponding to a corresponding area can be retrieved without depending on a network request in the APP.

It can be understood that, before the technical solutions disclosed in the embodiments of the present disclosure are used, a user should be notified of a type, a usage scope, a usage scenario, etc. of personal information involved in the present disclosure in a proper manner according to related laws and regulations, and authorization from the user is obtained. For example, in response to receiving an active request of a user, prompt information is sent to the user to explicitly prompt the user that the operation he requests to perform would require obtaining and using personal information of the user. Therefore, this enables the user to autonomously select, according to the prompt information, whether to provide the personal information to software or hardware such as an electronic device, an APP, a server, or a storage medium that performs the operations of the technical solution of the present disclosure.

As an optional but non-limiting implementation, in response to receiving an active request of a user, prompt information may be sent to the user in a manner such as a pop-up window, where the prompt information may be presented in a manner of text. In addition, the pop-up window can also have therein carried a selection control for selecting, by the user, "agreeing" or "disagreeing" with providing the personal information to an electronic device. It can be understood that the above notification and user authorization processes are only illustrative and are not intended to limit the implementation of the present disclosure, and other manners that satisfy the relevant laws and regulations are applicable to the implementations of the present disclosure.

According to an embodiment of the present disclosure, there is provided a traffic scheduling method of an application; it should be noted that steps illustrated in flow diagrams of the drawings may be implemented in a computer system such as a set of computer-executable instructions, and that although a logical order is illustrated in the flow diagram, in some cases, the steps illustrated or described may be performed in a different order from that here.

In this embodiment, there is provided a traffic scheduling method of an application APP, which is applicable to the above computing device, such as a mobile phone, a tablet, and a computer, the computer device having the APP installed therein. FIG. 1 is a flow diagram of a traffic scheduling method of an application according to an embodiment of the present disclosure, and as shown in FIG. 1, the flow comprises the following steps:

step S101, obtaining a first registration area of a target service of the APP and a second registration area where an account of a target object is located, wherein, the first registration area is determined by the APP in response to a registration operation of the target object for the target service, and the second registration area is determined by the APP in response to an account registration operation of the target object.

The APP is a computer program deployed in a computer device that is operated in a user mode and has a visual user interface capable of interacting with a user. The target service is a function possessed by the APP, such as a store opening service, and a product live service.

The first registration area is a service area determined when the target service is registered, that is, an area where the target service can be executed, for example, an area A, an area B, and the like. Specifically, the first registration area may be obtained by the computer device by analyzing registration information of the target service. In the embodiments of the present disclosure, "an area" can refer to one or more countries, a specific area within a country, a state, a province, or a particular geographical area.

The second registration area is a registration region for an APP account, i.e., a location of the APP account. Specifically, the second registration area may be determined according to an Internet Protocol (IP) address of the computer device and an attribution location of an operating system.

In some optional implementations, if the computer device is a mobile phone, the second registration area may also be determined according to an attribution location of a subscriber identity module (SIM) mounted in the mobile phone.

Step S102, detecting whether the first registration area is the same as the second registration area.

The first registration area is compared with the second registration area to determine whether the first registration area is the same as the second registration area. When the first registration area is not the same as the second registration area, step S103 is performed; and when the first registration area is the same as the second registration area, it is indicated that the target service is consistent with the registration area of the account, so that at this time, it is enough to perform traffic scheduling in the registration area depending on a registration area tag of the account.

Step S103, when the first registration area is not the same as the second registration area, determining a target domain name corresponding to the first registration area based on a mapping relationship between a registration area and a domain name. The mapping relationship is deployed in the application.

There is a mapping relationship between the first registration area and a domain name, and this mapping relationship is pre-deployed in the APP, so that when the first registration area is not the same as the second registration area, target domain name information corresponding to the first registration area is determined according to the mapping relationship.

The target domain name information indicates domain name information corresponding to the first registration area. The mapping relationship between the registration area and the domain name can be built into the APP in a form of a configuration table, and the configuration table is therein provided with server domain name information corresponding to different service registration areas. The computer device may analyze the mapping relationship built in the APP to determine the target domain name information corresponding to the first registration area therefrom.

Step S104, scheduling service traffic generated by the target service to a target server corresponding to the target domain name information.

The target server is in one-to-one correspondence with the target domain name information, and the service traffic is data request traffic generated by the target service in the operation process. After the target domain name information is determined, the service traffic generated by the operation of the target service can be scheduled to the corresponding target server subsequently.

For example, service registration areas are an area A, an area B, and an area C, with corresponding domain name information of test1.com, test2.com, and test3.com, respectively, then service traffic generated by a target service is scheduled according to the mapping relationship between the service registration area and the domain name information.

If servers corresponding to the test1.com, test2.com and test3.com are a server 1, a server 2 and a server 3, respectively, when, it is determined by analyzing registration information of the target service that a first registration area of the target service is the area B, the mapping relationship between the service registration area and the domain name information is traversed, so that it can be determined that target domain name information corresponding to the first registration area is test2.com, and then in combination with the test2.com, the service traffic generated by the target service can be scheduled to the server 2 corresponding to the test2.com.

In the traffic scheduling method of an application provided in this embodiment, by deploying a mapping relationship between a first registration area and a domain name in an APP, when the first registration area is not the same as a second registration area, the mapping relationship may be read from the APP to determine target domain name information corresponding to the first registration area, so as to schedule service traffic to a target server corresponding to the target domain name information. Therefore, the scheduling decision of the service traffic does not depend on a network request, and the server corresponding to the attribution area of the service traffic can be determined within the APP, so as to accurately schedule the service traffic to a desired server, achieving the effective remote scheduling of the service traffic.

Figure 2:
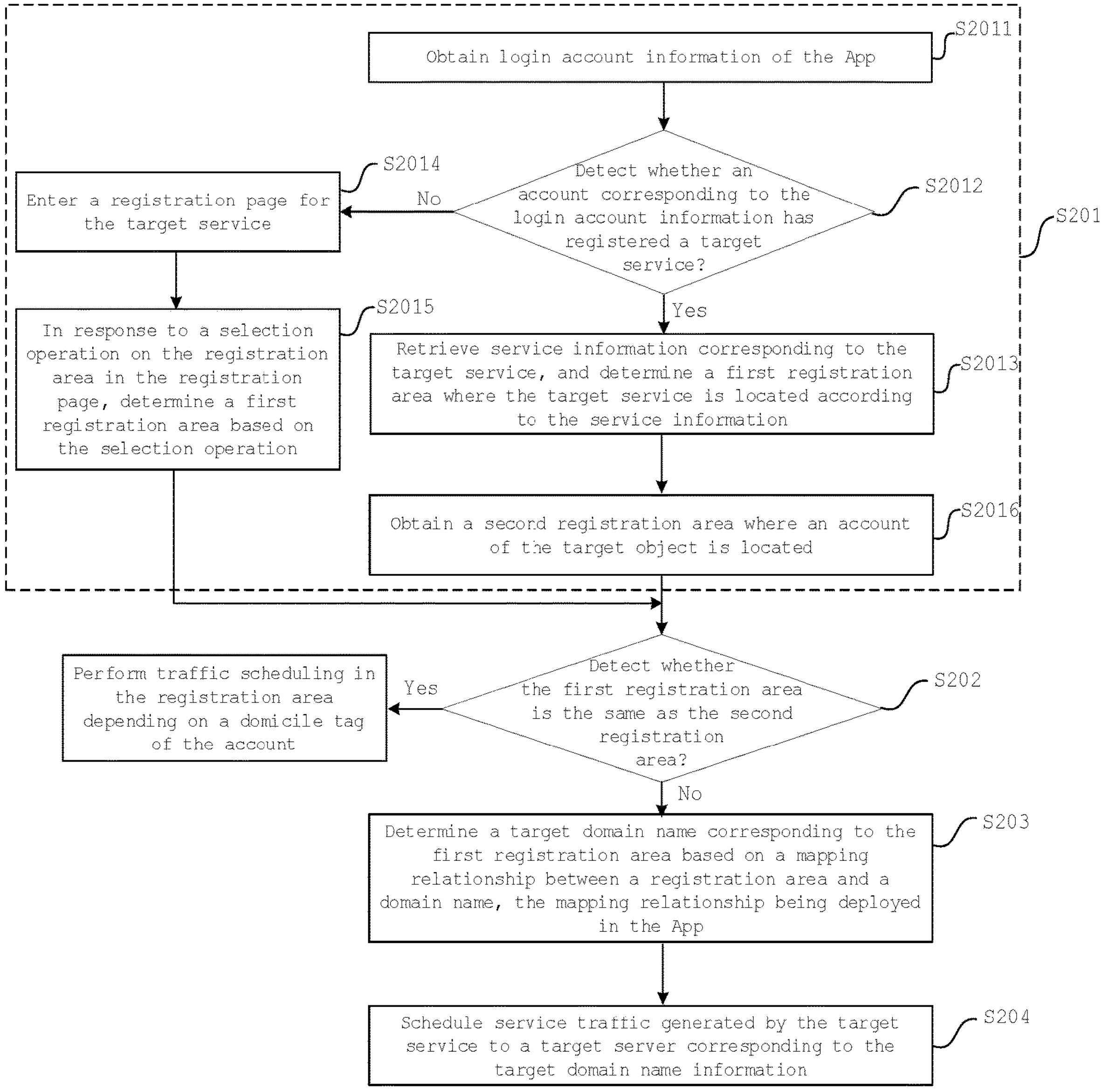
FIG. 2 is a schematic flow diagram of another traffic scheduling method of an application according to an embodiment of the present disclosure.

This embodiment provides a traffic scheduling method of an application APP, which is applicable to the above computing device, such as a mobile phone, a tablet, and a computer, the computing device having the APP installed therein. FIG. 2 is a flow diagram of a traffic scheduling method of an application according to an embodiment of the present disclosure, and as shown in FIG. 2, the flow comprises the following steps:

step S201, obtaining a first registration area of a target service of the APP and a second registration area where an account of a target object is located, wherein, the first registration area is determined by the APP in response to a registration operation of the target object for the target service, and the second registration area is determined by the APP in response to an account registration operation of the target object.

Specifically, the above step S201 may comprise:

step S2011, obtaining login account information of the application.

The login account information is used for characterizing account data generated by the target object registering the APP, the account data representing a registration area of the target object.

Specifically, the login account information is stored in a cache space of the computer device, when it is detected that the target object starts the APP and enters a login page of the APP, the APP can call a login interface to retrieve the corresponding login account information from the cache space of the computer device after the successful login.

It should be noted that, if the target object has not currently registered the APP, it may enter a registration page for the APP after starting the APP, so as to in response to a registration operation of the target object for the APP, obtain login account information generated by the target object when registering the APP.

Step S2012, detecting whether an account corresponding to the login account information has registered a target service.

The target service is a service associated with the current account, i.e., another service registered by the target object in the APP after registering the application. Since there is an association between the target service and the login account information, after the login account information is obtained, it can be determined whether the current account has registered the target service by detecting data associated with the login account information. When it is determined that the current account has registered the target service, step S2013 is performed, otherwise, step S2014 is performed.

Step S2013, when it is determined that the account has registered the target service, calling service information corresponding to the target service, and determining a first registration area where the target service is located according to the service information.

The service information represents registration data of the target object for the target service, and the service information includes service account data, service password data, service attribution area data and the like. When it is determined that the account corresponding to the login account information has registered the target service, and after the target object successfully logs in the target service, the first registration area can be retrieved from the service information returned by a target service interface.

Step S2014, when it is determined that the account has not registered the target service, entering a registration page for the target service. The registration page comprises a plurality of registration areas.

When it is determined that the account corresponding to the login account information has not registered the target service, in a visualization page for the APP, a plurality of service tags are displayed, which are used for triggering entering corresponding service pages. When the target object clicks or triggers a tag of the target service, a registration page for the target service is entered, and a plurality of registration areas are displayed in the registration page. The registration areas are different areas, which are used for determining an area server to be requested by a subsequent service interface request.

Step S2015, in response to a selection operation on the registration area in the registration page, determining a first registration area based on the selection operation.

The target object selects, in the registration page, an area where the target service is located, and accordingly, the registration page for the target service can, in response to the selection operation of the target object for the registration area, call a registration interface to complete the registration for the target service. Then, in conjunction with the registration information of the target service, the registration area selected by the target object is determined as a first registration area.

It should be noted that, it is not considered here whether the target service is successfully registered, and for the target service not successfully registered, the target object may be re-registered and the registration area may be re-selected.

Step S2016, obtaining a second registration area where an account of the target object is located. For the related description of the second registration area, please refer to the above embodiment, which is not repeated here.

Step S202, detecting whether the first registration area is the same as the second registration area. For details, please refer to the step S102 of the embodiment shown in FIG. 1, which is not repeated here.

Step S203, when the first registration area is not the same as the second registration area, determining a target domain name corresponding to the first registration area based on a mapping relationship between a registration area and a domain name. The mapping relationship is deployed in the application. For details, please refer to the step S103 of the embodiment shown in FIG. 1, which is not repeated here.

In some optional implementations, the above method may further comprise: when it is detected that the registration area and/or the domain name have/has been changed, determining an updated registration area and/or domain name; and updating the mapping relationship between the registration area and the domain name by using the updated registration area and domain name.

Technicians can modify, add and delete the mapping relationship between the service registration area and the domain name according to actual requirements.

For example, when the computer device detects that the registration area and/or domain name has been modified, a modified registration area and/or domain name are/is determined, and the mapping relationship between the service registration area and the domain name is re-determined according to the modified registration area and/or domain name.

For example, when the computer device detects that the registration area and/or domain name have/has been added or deleted, a newly added registration area and/or domain name and a deleted registration area and/or domain name are determined. Then, the mapping relationship between the service registration area and the domain name is added or deleted.

In this implementation, online updating of the mapping relationship between the registration area and the domain name is supported, so that the mapping relationship between the registration area and the domain name can be flexibly updated.

Step S204, scheduling service traffic generated by the target service to a target server corresponding to the target domain name information. For details, please refer to the step S103 of the embodiment shown in FIG. 1, which is not repeated here.

In the traffic scheduling method of an application APP provided in this embodiment, by detecting login account information of the APP to determine whether an account corresponding to the login account information has registered a target service, if the account has registered the target service, a corresponding registration area can be read from service information, so that it is enough to schedule service traffic according to the registration area, ensuring that the service traffic is scheduled to a desired server. When it is detected that the account has not registered the target service, it is possible to jump to a registration page for the target service to register the target service and select a registration area for the target service in the registration page, so that service traffic can be scheduled subsequently according to the registration area when the target service is registered.

Figure 3:
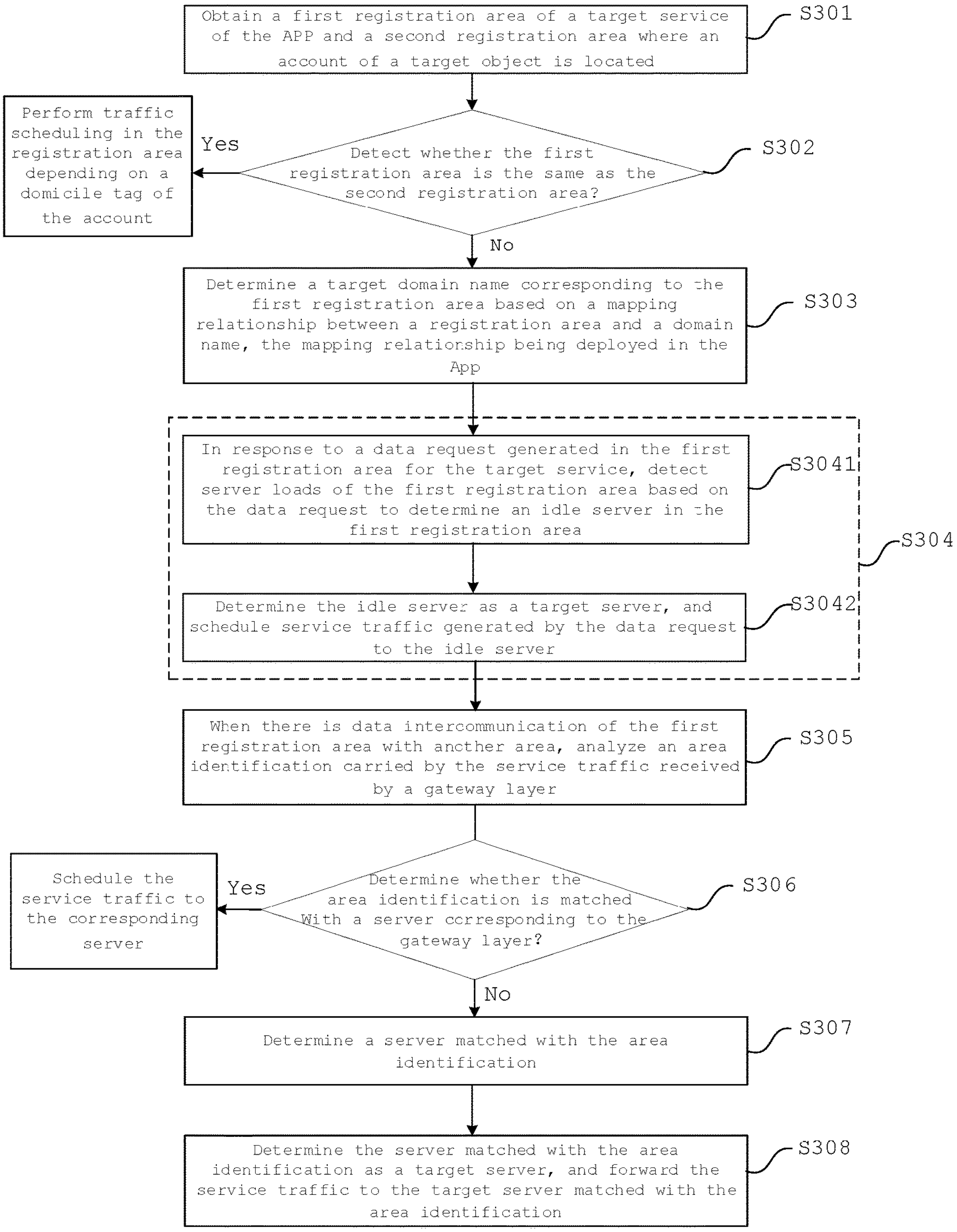
FIG. 3 is a schematic flow diagram of yet another traffic scheduling method of an application according to an embodiment of the present disclosure.

This embodiment provides a traffic scheduling method of an application APP, which is applicable to the above computing device, such as a mobile phone, a tablet, and a computer, the computing device having the APP installed therein. FIG. 3 is a flow diagram of a traffic scheduling method of an application APP according to an embodiment of the present disclosure, and as shown in FIG. 3, the flow comprises the following steps:

step S301, obtaining a first registration area of a target service of the APP and a second registration area where an account of a target object is located, wherein the first registration area is determined by the APP in response to a registration operation of the target object for the target service, and the second registration area is determined by the APP in response to an account registration operation of the target object. For details, please refer to the step S201 of the embodiment shown in FIG. 2, which is not repeated here.

Step S302, detecting whether the first registration area is the same as the second registration area. For details, please refer to the step S202 of the embodiment shown in FIG. 2, which is not repeated here.

Step S303, when the first registration area is not the same as the second registration area, determining a target domain name corresponding to the first registration area based on a mapping relationship between a registration area and a domain name. The mapping relationship is deployed in the application. For details, please refer to the step S203 of the embodiment shown in FIG. 2, which is not repeated here.

Step S304, scheduling service traffic generated by the target service to a target server corresponding to the target domain name information.

Specifically, the above step S304 may comprise:

step S3041, in response to a data request generated in the first registration area for the target service, detecting server loads of the first registration area based on the data request to determine an idle server in the first registration area.

The idle server is a server with the server loads less than a preset threshold.

The data request is a request triggered by the target object in the first registration area for the target service. Specifically, when the target object triggers a data request, the APP in the computer device pulls traffic scheduling configuration information of the first registration area after receiving the data request, the traffic scheduling configuration information being therein configured with a mapping from the data request to a real request URL. A domain name address corresponding to idle domain name information in the first registration area is a domain name address of the real request URL.

Specifically, the first registration area is therein configured with a plurality of servers, different servers corresponding to different domain names, so that when the data request is obtained, server loads in the first registration area can be detected, thereby determining a domain name currently in an idle state and an idle server corresponding to the domain name.

Step S3042, determining the idle server as a target server, and scheduling service traffic generated by the data request to the idle server.

After the idle server is determined, the idle server is taken as a target server providing traffic scheduling, and traffic generated by the target service in the first registration area is scheduled to the idle server.

In some optional embodiments, the method may further comprise:

step a1, obtaining a default domain name corresponding to the first registration area;

step a2, when the service traffic generated by the data request is not successfully scheduled to the idle server, determining a default server corresponding to the default domain name as the target server, and scheduling the service traffic generated by the data request to the default server corresponding to the default domain name.

The default server is a pre-specified server for scheduling the service traffic.

When the traffic configuration information of the first registration area is pulled to determine the idle server, if the service traffic generated by the data request is not successfully scheduled to the idle server due to poor server load and network conditions, the data request is linked to the default server corresponding to the default domain name, so that the service traffic generated by the target service can still be scheduled to the server in the first registration area, without scheduling to another area server.

Taking table 1 as an example, if a server No. 16 in a first registration area is an idle server, a data request is issued to a real request domain name: test1-16.XXX.com. If the issuance fails, the request is by default to test1.XXX.com, also still to the server in the first registration area, without scheduling to a wrong server in another area.

TABLE 1

Traffic Configuration Table

| First registration area | Default domain name | Real request domain name |
|---|---|---|
| A | test1-a.XXX.com | test1-a-16.XXX.com |
| B | test1-b.XXX.com | test1-b-22.XXX.com |

In this implementation, if the service traffic generated by the first registration area is not successfully scheduled to the idle server, the service traffic is scheduled to the default server, so that the case of scheduling to a wrong server due to poor server load and network conditions can be avoided, ensuring that the service traffic of the first registration area can be scheduled to a correct server, and achieving, to a certain extent, fault tolerance of server scheduling in the first registration area.

In some optional implementations, the above method may further comprise:

step S305, when there is data intercommunication of the first registration area with another area, analyzing an area identification carried by the service traffic received by a gateway layer.

In a server area where the data area intercommunication is allowed, data in its gateway layer is intercommunicated. If there is data intercommunication between the first registration area and another area, there may be a data request of the other area scheduled to the gateway layer of the first registration area. Then, when the gateway layer in the first registration area receives service traffic, it may analyze the service traffic to obtain an area identification carried by the service traffic.

Step S306, determining whether the area identification is matched with a server corresponding to the gateway layer.

The area identification carried by the service traffic is compared with the server area corresponding to the gateway layer to determine whether the two are matched, that is, determine whether the area identification is the server area corresponding to the gateway layer. If the area identification is not matched with the server corresponding to the gateway layer, step S308 is performed; if the area identification is matched with the server corresponding to the gateway layer, the gateway layer can directly schedule the service traffic to the corresponding server.

Step S307, when it is determined that the area identification is not matched with the server corresponding to the gateway layer, determining a server matched with the area identification.

When it is determined that the area identification is not matched with the server corresponding to the gateway layer, the gateway layer may determine, according to the area identification, a server matched with the area identification.

Step 308, determining the server matched with the area identification as a target server, and forwarding the service traffic to the target server matched with the area identification.

The server matched with the area identification is determined as the target server, and the service traffic is forwarded to the target server matched with the area identification by the gateway layer. For example, data intercommunication is allowed between a first registration area A1 and an area C1, an area identification of the first registration area A1 is I, an area identification of the area C1 is S, and if service traffic carrying the area identification S is scheduled to a server gateway layer in the first registration area A1, the server gateway layer will forward the service traffic to a server in the area C1 corresponding to the area identification S, so as to schedule, in the gateway layer, the service traffic to the correct server.

In the traffic scheduling method of an application provided in this embodiment, by detecting server loads in a first registration area, an idle server in the first registration area is determined to optimize the load of the server in the same area, achieving traffic scheduling in the same area. In a server area of data intercommunication, when it is determined that an area identification carried by service traffic is not matched with a server where a gateway layer is located, the gateway layer can forward the service traffic to a matched target server, further ensuring accurate scheduling of the service traffic. Therefore, flexible scheduling between different areas is achieved by means of multiple traffic scheduling, while ensuring that the service traffic can be scheduled to a correct server surely.

In this embodiment, there is further provided an traffic scheduling apparatus of an application APP, which is used for implementing the foregoing embodiments and preferred implementations which are not repeated since already described. As used below, the term "module" may be a combination of software and/or hardware that implements a predetermined function. Although the apparatus described in the embodiment below is preferably implemented in software, an implementation in hardware or a combination of software and hardware is also possible and contemplated.

Figure 4:
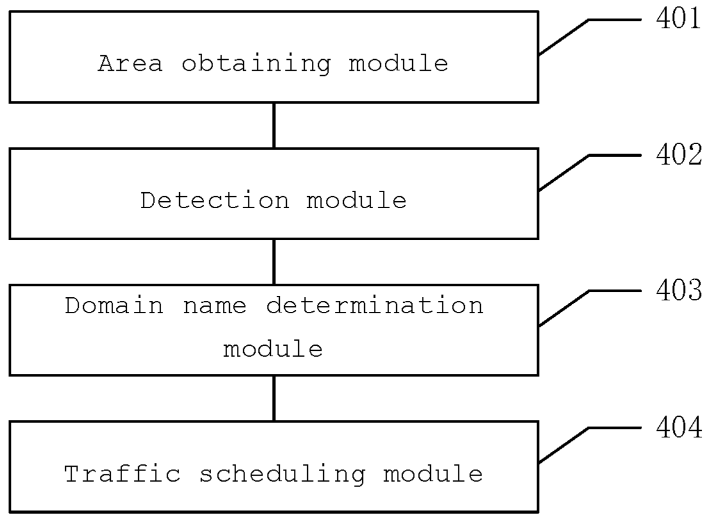
FIG. 4 is a structural block diagram of an traffic scheduling apparatus of an application according to an embodiment of the present disclosure.

This embodiment provides an traffic scheduling apparatus of an application APP, as shown in FIG. 4, comprising:

an area obtaining module 401, configured to obtain a first registration area of a target service of the APP and a second registration area where an account of a target object is located, wherein, the first registration area is determined by the APP in response to a registration operation of the target object for the target service, and the second registration area is determined by the APP in response to an account registration operation of the target object;

a detection module 402, configured to detect whether the first registration area is the same as the second registration area;

a domain name determination module 403, configured to, when the first registration area is not the same as the second registration area, determine a target domain name corresponding to the first registration area based on a mapping relationship between the first registration area and the domain name, wherein, the mapping relationship is deployed in the application;

a traffic scheduling module 404, configured to schedule service traffic generated by the target service to a target server corresponding to the target domain name information.

In some optional implementations, the above area obtaining module 401 may comprise:

a data obtaining unit, configured to obtain login account information of the application;

a detection unit, configured to detect whether an account corresponding to the login account information has registered the target service; and an information retrieval unit, configured to, when it is determined that the current account has registered the target service, retrieve service information corresponding to the target service, and determine the first registration area where the target service is located according to the service information.

In some optional implementations, the above area obtaining module 401 may further comprise:

a registration unit, configured to, when it is determined that the current account has not registered the target service, enter a registration page for the target service, wherein, the registration page comprises a plurality of registration areas.

an area selection unit, configured to, in response to a selection operation on the registration area in the registration page, determine the first registration area based on the selection operation.

In some optional implementations, the above apparatus may further comprise:

an updating module, configured to, when it is detected that the registration area and/or the domain name have/has been changed, determine an updated registration area and/or domain name, and update the mapping relationship between the registration area and the domain name by using the updated registration area and domain name.

In some optional implementations, the above traffic scheduling module 403 may comprise:

a server load detection unit, configured to, in response to a data request generated in the first registration area for the target service, detect server loads of the first registration area based on the data request to determine an idle server in the first registration area; and a scheduling unit, configured to determine the idle server as the target server and schedule the service traffic generated by the data request to the idle server.

In some optional implementations, the above traffic scheduling module 403 may further comprise:

a default domain name obtaining unit, configured to obtain a default domain name corresponding to the first registration area.

a default scheduling unit, configured to, when the service traffic generated by the data request is not successfully scheduled to the idle server, determine a default server corresponding to the default domain name as the target server, and schedule the service traffic generated by the data request to the default server corresponding to the default domain name, wherein, the default server is a pre-specified server for scheduling the service traffic.

In some optional implementations, the above traffic scheduling apparatus of an application APP may further comprise:

an identification obtaining module, configured to, when there is data intercommunication of the first registration area with another attribution area, analyze an area identification carried by the service traffic received by a gateway layer;

a determination module, configured to determine whether the area identification is matched with a server corresponding to the gateway layer;

a matching module, configured to, when it is determined that the area identification is not matched with the server corresponding to the gateway layer, determine a server matched with the area identification;

a flow forwarding module, configured to determine the server matched with the area identification as the target server, and forward the service traffic to the target server matched with the area identification.

Further functional descriptions of the above modules and units are the same as those of the corresponding embodiments above, which are not repeated here.

The traffic scheduling apparatus of an application in this embodiment is presented in a form of functional units, the units here referring to an ASIC circuit, a processor and a memory executing one or more software or fixed programs, and/or other devices that can provide the above functions.

In the traffic scheduling apparatus of an application APP provided in this embodiment, by deploying a mapping relationship between a registration area and a domain name in the APP, when a first registration area is not the same as a second registration area, the mapping relationship may be read from the APP to determine target domain name information corresponding to the first registration area, so as to schedule service traffic to a target server corresponding to the target domain name information. Therefore, the scheduling decision of the service traffic does not depend on a network request, and the server corresponding to the attribution area of the service traffic can be determined within the APP, to accurately schedule the service traffic to a desired server, achieving the effective remote scheduling of the service traffic.

An embodiment of the present disclosure further provides a computer device, which has the traffic scheduling apparatus of an application shown in FIG. 4.

Figure 5:
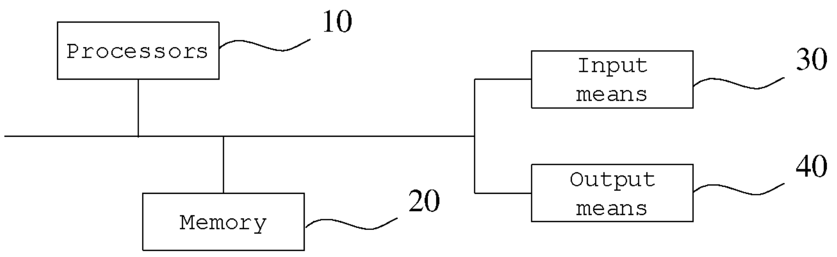
FIG. 5 is a schematic hardware structural diagram of a computer device according to an embodiment of the present disclosure.

Referring to FIG. 5, FIG. 5 is a schematic structural diagram of a computer device according to an optional embodiment of the present disclosure, as shown in FIG. 5, the computer device comprising: one or more processors 10, a memory 20, and interfaces for connecting components, including high-speed interfaces and low-speed interfaces. The components are communicatively connected to each other by using different buses and may be mounted on a common motherboard or in other manners as needed. The processor may process instructions executed within the computer device, including instructions stored in or on the memory to display graphical information of a GUI on an external input/output means (such as a display device coupled to the interface). In some optional implementations, if needed, multiple processors and/or multiple buses may be used together with multiple memories. Similarly, multiple computer devices may be connected, each device providing partial necessary operations (e.g., serving as a server array, a set of blade servers, or a multi-processor system). One processor 10 is exemplified in FIG. 5.

The processor 10 may be a central processing unit, a network processor, or a combination thereof. The processor 10 may further include a hardware chip. The above hardware chip may be an application specific integrated circuit, a programmable logic device, or a combination thereof. The above programmable logic device may be a complex programmable logic device, a field programmable gate array, generic array logic, or any combination thereof.

The memory 20 has thereon stored instructions executable by the at least one processor 10, to cause the at least one processor 10 to perform and implement the method shown in the above embodiment.

The memory 20 may include a storage program area and a storage data area, wherein the storage program area may store an operating system, an APP required for at least one function; and the storage data area may store data created according to the use of the computer device, and the like. Furthermore, the memory 20 may include a high speed random access memory, and may also include a non-transitory memory, such as at least one magnetic disk storage device, flash memory device, or other non-transitory solid state storage devices. In some optional implementations, the memory 20 may optionally include a memory provided remotely with respect to the processor 10, wherein these remote memories may be connected to the computer device via a network. Examples of the above network include, but are not limited to, the Internet, an enterprise intranet, a local area network, a mobile communication network, and combinations thereof. The memory 20 may include a volatile memory, such as a random access memory; the memory may also include a non-volatile memory, such as a flash memory, a hard disk, or a solid state disk; and the memory 20 may also include combinations of the above types of memories.

The computer device further comprises an input means 30 and an output means 40. The processor 10, the memory 20, the input means 30 and the output means 40 may be connected by a bus or other manner, connection by the bus being exemplified in FIG. 5.

The input means 30 may receive input numeric or character information and generate key signal inputs associated with user settings and function control of the computer device, such as a touch screen, keypad, mouse, track pad, touch pad, pointer stick, one or more mouse buttons, trackball, joystick or the like. The output means 40 may include a display device, an auxiliary lighting device (e.g., an LED), a haptic feedback device (e.g., a vibration motor), and the like. The above display device includes, but is not limited to, a liquid crystal display, light-emitting diode, display, and plasma display. In some optional implementations, the display device may be a touch screen.

The computer device further includes a communication interface for data communication of the computer device with another device or a communication network.

An embodiment of the present disclosure further provides a computer-readable storage medium, wherein the above method according to the embodiment of the present disclosure can be implemented in hardware and firmware, or implemented as recordable on a storage medium, or implemented as computer code downloaded by a network, originally stored in a remote storage medium or a non-transitory machine-readable storage medium and to be stored in a local storage medium, so that the method described herein can be processed by such software stored on a storage medium using a general-purpose computer, a dedicated processor, or programmable or dedicated hardware. The storage medium can be a magnetic disk, an optical disk, a read-only memory, a random access memory, a flash memory, a hard disk or a solid state disk; further, the storage medium may also include a combination of the above types of memories. It can be appreciated that the computer, processor, microprocessor controller or programmable hardware includes a storage component that can store or receive software or computer code which, when accessed and executed by the computer, processor or hardware, implements the method illustrated in the above embodiment.

Although the embodiments of the present disclosure have been described in conjunction with the accompanying drawings, those skilled in the art may make various modifications and variations without departing from the spirit and scope of the present disclosure, such modifications and variations all falling within the scope defined by the attached claims.

What is claimed is:

1. A method of scheduling traffic in an application, comprising:

obtaining a first registration area of a service of the application and a second registration area associated with a location of an account of an object, the first registration area determined by the application in response to a registration operation of the object for the service, and the second registration area determined by the application in response to an account registration operation of the object;

detecting that the first registration area is different from the second registration area;

in response to the first registration area being different from the second registration area, determining a domain name corresponding to the first registration area based on a mapping relationship between the first registration area and a domain name, the mapping relationship deployed in the application; and scheduling service traffic generated by the service to a server corresponding to the domain name.

2. The method of claim 1, wherein the obtaining a first registration area of the service of the application comprises:

obtaining login account information of the application;

detecting whether an account corresponding to the login account information has registered the service;

in response to determining the account has registered the service, retrieving service information corresponding to the service; and determining the first registration area where the service is located according to the service information.

3. The method of claim 2, further comprising:

in response to determining the account has not registered the service, entering a registration page for the service, the registration page comprising a plurality of registration areas; and in response to determining a selection operation on one or more of the plurality of registration areas, determining the first registration area based on the selection operation.

4. The method of claim 1, further comprising:

determining at least one of a change in the registration area or a change in the domain name;

determining, based on the change in the registration area, an updated registration area and based on the change in the domain name, an updated domain name; and updating the mapping relationship between the registration area and the domain name with the at least one updated registration area or the updated domain name.

5. The method of claim 1, wherein the scheduling the service traffic generated by the service to the server corresponding to the domain name comprises:

determining, in response to a data request generated in the first registration area for the service, one or more server loads of one or more servers in the first registration area;

determining an idle server of the one or more servers in the first registration area with a server load less than a preset threshold; and scheduling, based at least in part on determining the idle server as the server, the service traffic generated by the data request to the idle server.

6. The method of claim 5, further comprising:

obtaining a default domain name corresponding to the first registration area;

determining that the service traffic generated by the data request is unsuccessfully scheduled to the idle server; and scheduling, based at least in part on determining a default server corresponding to the default domain name as an updated server, the service traffic generated by the data request to the updated server.

7. The method of claim 1, further comprising:

analyzing, based at least in part on determining data intercommunication of the first registration area with another area, an area identification carried by the service traffic received by a gateway layer of a second server;

determining the area identification of the second server matches the server's area identification; and forwarding the service traffic to the second server; or determining the area identification does not match the server's area identification; and determining a third server with an area identification matching the server.

8. A computing device, comprising:

a memory and a processor, the memory and the processor being communicatively connected to each other, the memory having computer instructions stored therein, and the processor, by executing the computer instructions, cause the computing device to:

obtain a first registration area of a service of the application and a second registration area associated with a location of an account of an object, the first registration area determined by the application in response to a registration operation of the object for the service, and the second registration area determined by the application in response to an account registration operation of the object;

detecting that the first registration area is different from the second registration area;

in response to the first registration area being different from the second registration area, determining a domain name corresponding to the first registration area based on a mapping relationship between the first registration area and a domain name, the mapping relationship deployed in the application; and scheduling service traffic generated by the service to a server corresponding to the domain name.

9. The computing device of claim 8, wherein the processor, by executing the computer instructions, further causes the computing device to:

obtain login account information of the application;

detect whether an account corresponding to the login account information has registered the service;

in response to determining the account has registered the service, retrieve service information corresponding to the service; and determine the first registration area where the service is located according to the service information.

10. The computing device of claim 9, wherein the processor, by executing the computer instructions, further causes the computing device to:

in response to determining the account has not registered the service, enter a registration page for the service, the registration page comprising a plurality of registration areas; and in response to determining a selection operation on one or more of the plurality of registration areas, determine the first registration area based on the selection operation.

11. The computing device of claim 8, wherein the processor, by executing the computer instructions, further causes the computing device to:

determine at least one of a change in the registration area or a change in the domain name;

determine, based on the change in the registration area, an updated registration area and based on the change in the domain name, an updated domain name; and update the mapping relationship between the registration area and the domain name with the at least one updated registration area or the updated domain name.

12. The computing device of claim 8, wherein the processor, by executing the computer instructions, further causes the computing device to:

determine, in response to a data request generated in the first registration area for the service, one or more server loads of one or more servers in the first registration area;

determine an idle server of the one or more servers in the first registration area with a server load less than a preset threshold; and schedule, based at least in part on determining the idle server as the server, the service traffic generated by the data request to the idle server.

13. The computing device of claim 12, wherein the processor, by executing the computer instructions, further causes the computing device to:

obtain a default domain name corresponding to the first registration area;

determine that the service traffic generated by the data request is unsuccessfully scheduled to the idle server; and schedule, based at least in part on determining a default server corresponding to the default domain name as an updated server, the service traffic generated by the data request to the updated server.

14. The computing device of claim 8, wherein the processor, by executing the computer instructions, further causes the computing device to:

analyze, based at least in part on determining data intercommunication of the first registration area with another area, an area identification carried by the service traffic received by a gateway layer of a second server;

determine the area identification of the second server matches the server's area identification; and forward the service traffic to the second server; or determine the area identification does not match the server's area identification; and determine a third server with an area identification matching the server.

15. A non-transitory computer-readable medium storing instructions that when executed, cause a computing device to perform operations comprising:

obtaining a first registration area of a service of the application and a second registration area associated with a location of an account of an object, the first registration area determined by the application in response to a registration operation of the object for the service, and the second registration area determined by the application in response to an account registration operation of the object;

detecting that the first registration area is different from the second registration area;

in response to the first registration area being different from the second registration area, determining a domain name corresponding to the first registration area based on a mapping relationship between the first registration area and a domain name, the mapping relationship deployed in the application; and scheduling service traffic generated by the service to a server corresponding to the domain name.

16. The non-transitory computer-readable medium of claim 15, wherein the operations further comprise:

obtaining login account information of the application;

detecting whether an account corresponding to the login account information has registered the service;

in response to determining the account has registered the service, retrieving service information corresponding to the service; and determining the first registration area where the service is located according to the service information.

17. The non-transitory computer-readable medium of claim 16, wherein the operations further comprise:

in response to determining the account has not registered the service, entering a registration page for the service, the registration page comprising a plurality of registration areas; and in response to determining a selection operation on one or more of the plurality of registration areas, determining the first registration area based on the selection operation.

18. The non-transitory computer-readable medium of claim 15, wherein the operations further comprise:

determining at least one of a change in the registration area or a change in the domain name;

determining, based on the change in the registration area, an updated registration area and based on the change in the domain name, an updated domain name; and updating the mapping relationship between the registration area and the domain name with the at least one updated registration area or the updated domain name.

19. The non-transitory computer-readable medium of claim 15, wherein the operations further comprise:

determining, in response to a data request generated in the first registration area for the service, one or more server loads of one or more servers in the first registration area;

determining an idle server of the one or more servers in the first registration area with a server load less than a preset threshold; and scheduling, based at least in part on determining the idle server as the server, the service traffic generated by the data request to the idle server.

20. The non-transitory computer-readable medium of claim 19, wherein the operations further comprise:

obtaining a default domain name corresponding to the first registration area;

determining that the service traffic generated by the data request is unsuccessfully scheduled to the idle server; and scheduling, based at least in part on determining a default server corresponding to the default domain name as an updated server, the service traffic generated by the data request to the updated server.

* * * * *